US012535895B2

(12) United States Patent
Sapp et al.

(10) Patent No.: US 12,535,895 B2
(45) Date of Patent: Jan. 27, 2026

(54) INPUT DEVICE

(71) Applicant: Apple Inc., Cupertino, CA (US)

(72) Inventors: Megan M. Sapp, San Francisco, CA (US); Brian T. Gleeson, Mountain View, CA (US); Steven J. Taylor, San Jose, CA (US); David H. Bloom, San Francisco, CA (US); Miao He, Sunnyvale, CA (US); Seung Wook Kim, San Jose, CA (US); Evangelos Christodoulou, Santa Clara, CA (US); Kristi E. Bauerly, Los Altos, CA (US); Geng Luo, Santa Clara, CA (US); Bart K. Andre, Palo Alto, CA (US)

(73) Assignee: APPLE INC., Cupertino, CA (US)

(\*) Notice: Subject to any disclaimer, the term of this patent is extended or adjusted under 35 U.S.C. 154(b) by 0 days.

(21) Appl. No.: 18/472,195

(22) Filed: Sep. 21, 2023

(65) Prior Publication Data

US 2024/0103643 A1    Mar. 28, 2024

Related U.S. Application Data

(60) Provisional application No. 63/478,523, filed on Jan. 5, 2023, provisional application No. 63/376,756, filed
(Continued)

(51) Int. Cl.
*G06F 3/0346* (2013.01)
*G06F 3/03* (2006.01)
*G06F 3/038* (2013.01)

(52) U.S. Cl.
CPC .......... *G06F 3/0346* (2013.01); *G06F 3/0304* (2013.01); *G06F 3/0383* (2013.01)

(58) Field of Classification Search
None
See application file for complete search history.

(56) References Cited

U.S. PATENT DOCUMENTS 6,844,871 B1    1/2005  Hinckley et al.
2010/0039381 A1  2/2010  Cretella et al.
(Continued)

FOREIGN PATENT DOCUMENTS

CN    113360012 A    9/2021
FR    2833092 A1 *  6/2003 ............. G06F 3/042
GB    2627854 B      6/2025

OTHER PUBLICATIONS

Translation of FR 2833092 A1 into English; Yves (Year: 2003).*
(Continued)

*Primary Examiner* — Brian M Butcher
(74) *Attorney, Agent, or Firm* — Dorsey & Whitney LLP

(57) ABSTRACT

A computer system can include an input device having a housing defining an internal volume. The housing can include a grip portion and a base portion defining an aperture. The computer system can also include a tilt sensor disposed in the internal volume, a position sensor disposed at the aperture, and a processor. The processor can be electrically coupled to the position sensor, the tilt sensor, and a memory component storing electronic instructions that, when executed by the processor, cause the processor to receive a first input from the tilt sensor, receive a second input from the position sensor, determine, based on the first and second inputs, if the base is in contact with a support surface and an angle of the base relative to the support surface. The processor can also output a signal based on the angle if the base is in contact with the support surface.

15 Claims, 9 Drawing Sheets

Related U.S. Application Data on Sep. 22, 2022, provisional application No. 63/376,650, filed on Sep. 22, 2022, provisional application No. 63/376,763, filed on Sep. 22, 2022, provisional application No. 63/376,767, filed on Sep. 22, 2022.

(56) References Cited

U.S. PATENT DOCUMENTS

| | | |
|---|---|---|
| 2012/0105207 A1 | 5/2012 | Trabucco et al. |
| 2015/0212598 A1 | 7/2015 | Lee |
| 2018/0356909 A1 | 12/2018 | Dayer et al. |
| 2019/0171302 A1 | 6/2019 | Su et al. |
| 2020/0150788 A1* | 5/2020 | Su ............................ G06F 3/016 |

OTHER PUBLICATIONS

PCT International Search Report and Written Opinion for PCT International Application No. PCT/US2023/074954, mailed Dec. 11, 2023, 15 pp.

* cited by examiner

INPUT DEVICE

CROSS-REFERENCE TO RELATED APPLICATION(S)

This claims priority to U.S. Provisional Patent Application No. 63/376,650, filed 22 Sep. 2022, and entitled "Input Device for Three-Dimensional Control," to U.S. Provisional Patent Application No. 63/376,756, filed 22 Sep. 2022, and entitled "Input Device with Adaptive Grip Orientation," to U.S. Provisional Patent Application No. 63/376,763, filed 22 Sep. 2022, and entitled "Multi-Mode Mouse," to U.S. Provisional Patent Application No. 63/376,767, filed 22 Sep. 2022, and entitled "Variable Friction and Multi-Texture Mouse," and to U.S. Provisional Patent Application No. 63/478,523, filed 5 Jan. 2023, and entitled "Input Device," the entire disclosures of which are hereby incorporated by reference in their entirety.

FIELD

The described embodiments relate generally to computer input systems. More particularly, the present embodiments relate to input device for computing systems.

BACKGROUND

Computing devices and systems, such as portable computers, tablets, desktop computers, and so forth, receive input from a user via an input device such as a mouse, trackpad, joystick, stylus, or other input device. The input device allows a user to move an input pointer, such as cursor on a screen, and make selections in a graphical user interface (GUI) on the computer system. The input device generally includes buttons and a location tracking device, for example, a mechanical or optical movement tracker, accelerometer, or other movement tracker. The location tracking device tracks user directed movements translating the user's motion into signals readable by a computer system. For example, a user may wish to select a feature displayed on a GUI. The user can direct an input device that translates the user's motion toward the desired feature displayed on the GUI and make the desired selection.

Conventional user input devices include mechanical buttons for data selection and command execution. The mechanical buttons are disposed near the top front portion of the user input device creating a unidirectional user interaction. However, conventional input devices are limited in the type and number of input gestures, button presses, or movements available to the user for controlling a computing device or one or more software applications thereof.

In addition, as the variety and complexity of software applications grow and vary, from word processors to video editing programs and from computer coding to computer aided design for engineering applications, conventional input devices fall short of providing a corresponding variety of possible input commands detected and sent by the input device. For example, the pressing of mechanical buttons and the translation of the input device across a surface in two-dimensions can be inefficient for controlling and manipulating images and objects in video or music editing software programs or three-dimensional design in CAD software. Learning how to navigate and control such programs can be non-intuitive and difficult.

For these and other reasons, there is a constant need for improvements to input devices.

SUMMARY

In at least one example of the present disclosure, a computer system can include an input device having a housing defining an internal volume. The housing can include a grip portion and a base. The computer system can also include a tilt sensor disposed in the internal volume, a position sensor, and a processor. The processor can be electrically coupled to the position sensor, the tilt sensor, and a memory component storing electronic instructions that, when executed by the processor, cause the processor to receive a first input from the tilt sensor, receive a second input from the position sensor, determine, based on the first and second inputs, if the base is contacting a support surface and an angle of the base relative to the support surface. The processor can also output a signal based on the angle if the base is in contact with the support surface.

In one example, the tilt sensor includes an inertial measurement unit. In one example, the position sensor includes an optical sensor configured to send and receive light through an aperture in the base. In one example, the input device includes the processor. In one example, the input device further includes an emitter electrically coupled to the tilt sensor and the position sensor, the emitter in electrical communication with the processor and configured to output the signal. In one example, the electronic instructions, when executed by the processor, cause the processor to determine if the input device is lifted completely off the support surface. In one example, the signal is a first signal and the electronic instructions, when executed by the processor, causes the processor to output a second signal if the base is not in contact with the support surface.

In at least one example of the present disclosure, an input device includes a grip portion, a base portion having a rest surface and a tilt surface angled relative to the rest surface and extending between the rest surface and the grip portion, and a tilt sensor operable to detect if the rest surface or the tilt surface is supporting a weight of the device.

In one example, the tilt sensor includes an inertial measurement unit. In one example, the tilt surface includes a first planar surface and a second planar surface adjacent the first planar surface. In one example, the grip portion is curvilinear. In one example, the input device further includes an optical position sensor. In one example, the base portion defines an aperture and the optical position sensor is positioned at or near the aperture to send and receive light through the aperture. In one example, the aperture is defined by the rest surface. In one example, the rest surface is planar, the tilt surface is planar, and the grip portion is curvilinear.

In at least one example of the present disclosure, a computer mouse includes a housing having a grip portion and a base having a rest surface configured to contact a support surface, the base defining an aperture, the housing having a central axis normal to the rest surface, an orientation sensor to detect a rotation of the grip portion about the central axis, and an optical position sensor configured to send and receive light through the aperture.

In one example, the grip portion is symmetric in any of a set of cross-sectional planes, wherein each cross-sectional plane of the set of cross-sectional planes intersects the central axis. In one example, the orientation sensor includes an inertial measurement unit. In one example, the grip portion and the base are formed as a single, unitary piece of material. In one example, the grip portion includes an upper section and a sidewall disposed between the upper section and the base, the sidewall being rotatable relative to the upper section.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
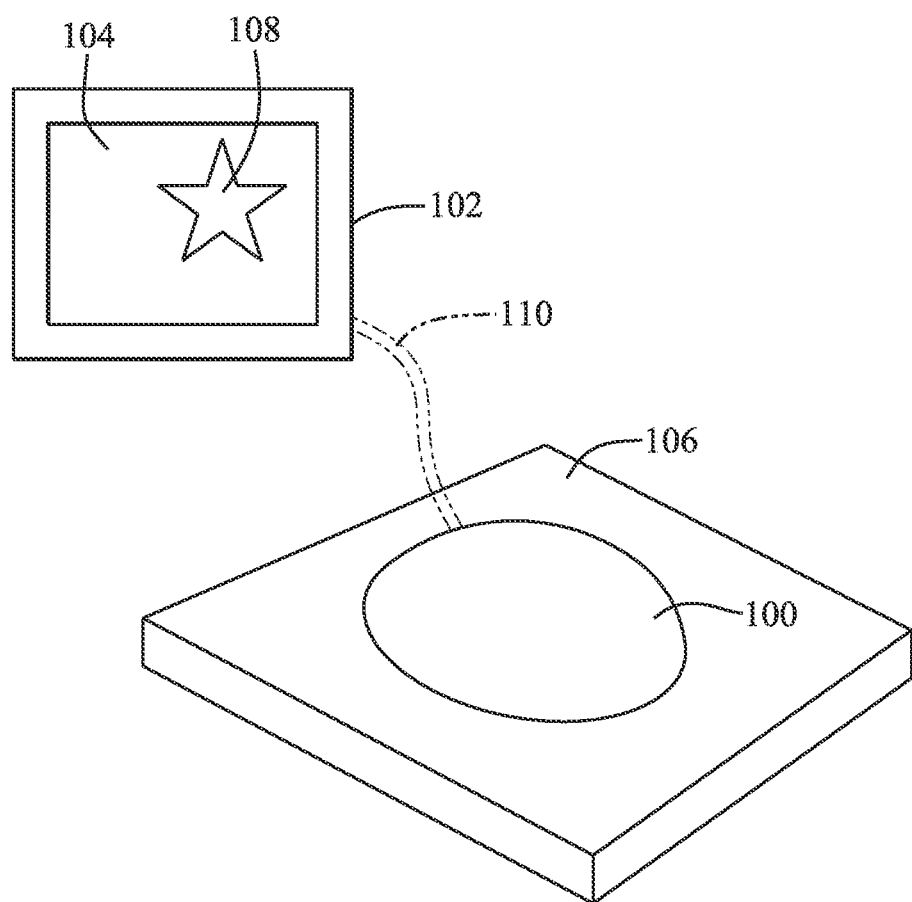
FIG. 1 shows a perspective view of an example of a computer system including an input device controlling a computing device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure relates generally to computer input systems. More particularly, the present embodiments relate to input device for computing systems. The input devices described herein provide additional input options and functionalities to a user. These additional input options and functionalities provide useful, intuitive, and easy to learn inputs for a user controlling a computing device. In one example, a computer system can include an input device having a housing defining an internal volume. The housing can include a grip portion and a base portion defining an aperture. The computer system can also include a tilt sensor disposed in the internal volume, a position sensor disposed at the aperture, and a processor. The processor can be electrically coupled to the position sensor, the tilt sensor, and a memory component storing electronic instructions that, when executed by the processor, cause the processor to receive a first input from the tilt sensor, receive a second input from the position sensor, determine, based on the first and second inputs, if the base is in contact with a support surface and an angle of the base relative to the support surface. The processor can also output a signal based on the angle if the base is in contact with the support surface.

In one example, the user can tilt the input device to cause a computing device to perform a desired function. The input device can be configured to send unique command signals to a computing device, causing the computing device to perform certain functions in response to the command signals based on the tilting of the device relative to a support surface and while positioned on or adjacent to the support surface. The support surface can be, for example, a desktop surface or other surface supporting the input device. The input device can be tilted in different directions or to different degrees, and those tilting motions or positions can be detected and interpreted as command signals for the computing device to perform a desired function. The desired function can be any function carried out by the computing device, whether visibly apparent on a display screen of the computing device or not.

Some examples of input devices described herein can include base portions having a rest surface (i.e., a predominantly-sized, substantially flat bottom surface) configured to support a weight of the input device on a support surface during use and having one or more tilt surface extending at an angle relative to the rest surface. The tilt surfaces can provide a distinct, angled surface onto which the user can push the input device and, in some embodiments, can define a stop surface onto which the input device can have limited further rotation when it contacts the support surface. The tilt surfaces of the input devices can guide a user toward a certain tilt angle or direction to provide definite, predetermined tilt inputs to the device (e.g., discrete predefined tilt angles) corresponding to certain functions of the computing device.

In addition to tilting input functionalities, input devices described herein can also include one or more orientation sensors or component movement sensors for detecting a rotation of the input device or a portion or component of the input device. The user can rotate the input device or a portion thereof to indicate a desired function to be performed by the computing device. Again, the desired function commanded by the user via the input device can vary between many options, including menu scrolling, image zooming and panning, volume or brightness control, and/or any other function carried out by the computing device in any sort of software application run by the computing device.

The tilt and rotation inputs detectable by input devices described herein expand the variety and number of available inputs available to a user. These additional and enhanced inputs can be used to intuitively and more effectively control visible and non-visible functions carried out by a computing device in software application having ever-increasing capabilities. This can include tilting and/or rotating the input devices to control and alter three-dimensionally represented objects in CAD software, visual effect menu selections within video and audio editing software programs, or any other software programs run by the computing device.

These and other embodiments are discussed below with reference to FIGS. 1-10. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates an input device 100 located on a support surface 106 being connected via a connector 110 to a computing device 102. The input device 100 can also be referred to herein as a mouse 100. The connector 110 is shown in broken lines to indicate that the connector 110 is optional. In one example, the mouse 100 can be wirelessly connected to the computing device 102. The computing device 102 can include a display screen 104 and an input pointer (e.g., a cursor) 108 displayed on the display screen 104. The mouse 100 can rest on a support surface 106 and be manipulated by a user interacting with the computing device 102 (e.g., a computer system). A processor in the mouse 100 or in the computing device 102 can transmit the user induced movement of the mouse 100 to the cursor 108 on the display screen 104 of the computing device 102, thus controlling the cursor 108 on the display screen 104.

The term "mouse" as used herein describes an electronic input device or circular user input device that is described herein as a mouse 100. In one or more examples, the electronic input devices or circular user input devices described herein, including the mouse 100, can be a remote control, volume control, cursor control device, click input device, pointer, gamepad, or other electronic input device capable of providing control signals to an electronic device like the computing device 102 shown in FIG. 1.

The mouse 100 can interact with a variety of electronic devices (e.g., laptops, tablets, televisions, virtual reality headsets, etc.) providing a diverse set of functions to users. The mode of the mouse 100 can change corresponding to the connection between the mouse 100 and an electronic device. For example, the mouse 100 can act as a mouse for a computer and can switch (dynamically or manually) between devices to interact with a television set or other electronic device or computing system.

The mouse 100 can be connected to the computing device 102 via the connector 110. In one example, the connector 110 can be a cable (e.g., a plurality of wires for transmitting energy, control signals, or other interface data) creating a wired connection between the mouse 100 and another electronic device (e.g., a computer, display, television, similar device, or combinations thereof). In one example, the connector 110 between the mouse 100 and the computing device 102 or other electronic device can be wireless (e.g., compatible with BLE, RF, WLAN, LAN, WPAN, other wireless standards, and combinations thereof) electronically communicating movements of the mouse 100 to the computing device 102 or other electronic device.

A user can grip the mouse 100 in a variety of grip configurations and hand positions. For example, a user can use a left hand to grip electronic device 100 in one instance and a right had to grip the mouse 100 in another instance. In another example, the user can grip the mouse 100 with all five fingers and a portion of his or her palm (i.e., a "claw" grip). In another example, the user can grip the mouse 100 with only two or three fingers (i.e., a "pincer" grip). The mouse 100 can actively and automatically reorient which direction corresponds to direction of the cursor 108 on the display screen 104 based on the position of the user's hand. Additionally, as will be described in greater detail below with reference to other figures, the circular design of the mouse 100 allows the user to grip the electronic input device in different orientations without having to physically reorient the mouse or otherwise interrupt its functionality and ability to receive finger input.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2A:
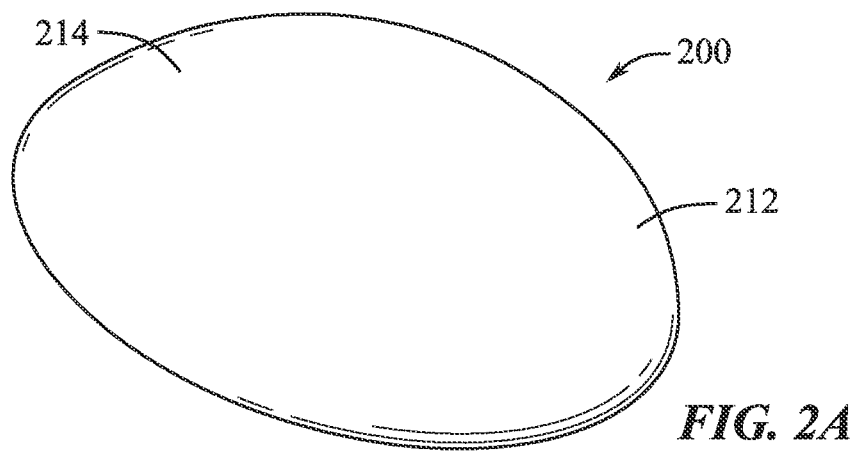
FIG. 2A shows a top perspective view of an example of an input device.
Figure 2B:
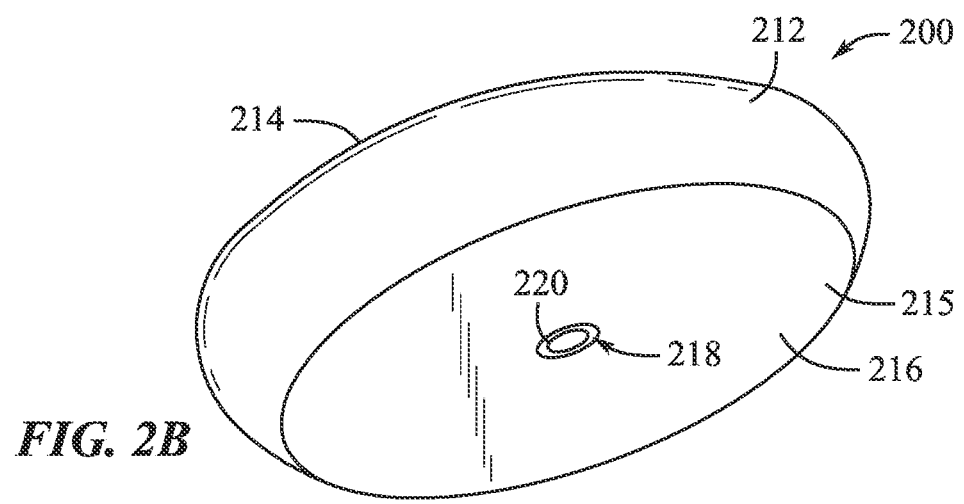
FIG. 2B shows a bottom perspective view of the input device of FIG. 2A.

FIGS. 2A and 2B illustrate top and bottom perspective views, respectively, of an input device 200, which can also be referred to as a mouse 200, including a housing 212 having a grip portion 214 and a lower base portion 215 defining a lower rest surface (e.g., a primary contact surface) 216. In at least one example, the rest surface 216 can be configured to contact a support surface, such as a mouse pad or desktop surface, to support the weight of the mouse 200 during normal operation and while the mouse 200 is at rest and not supported by an appendage of the user. The mouse 200 can be an example embodiment of the mouse 100 of FIG. 1. The lower surface 216 is configured to rest on a support surface 106 whereby the mouse 200 can be slidably translated from one position to another position by a user. The mouse 200 further includes a position sensor 220, for example, an optical sensor for determining location, position, or movement. In at least one example, the position sensor 220 can be an optical sensor positioned at or near an aperture 218 defined by the base portion 215 and lower resting surface 216 thereof to send and receive light through the aperture 218. In one example, the optical sensor can include an infrared sensor. In one or more other examples, the position sensor 220 can include a mechanical location sensor (e.g., a mouse ball), a laser location, position, or movement sensor, a similar device, or combinations thereof, aligned with an aperture 218 defined in the base portion 215. The position sensor 220, aligned with the aperture 218, can detect the support surface 106 and movement (changes in location) of the mouse 200 on the support surface 106 through the aperture 218.

In at least one example, the aperture 218 can include a through-hole passing through at least one material layer or lower wall of the lower resting surface 216 of the base portion 215 to allow light to pass through the lower resting surface 216. In such an example, the aperture 218 can include a physical opening in the lower resting surface 216. In one or more other examples, the lower resting surface 216 can include an optically or electromagnetically transparent portion, where the aperture 218 would otherwise be located. Thus, the housing wall at the lower resting surface 216 can omit an aperture 218 and can instead have a window-like transparent portion that allows electromagnetic signals (e.g., infrared waves, ultraviolet waves, similar signals, or combinations thereof) to be emitted and received via the position sensor 220 through the lower resting surface 216. This can make the lower resting surface 216 have a continuous, unbroken, substantially flat, visually appealing surface appearance. In some cases, the transparent portion can be visually opaque to a human eye while being transparent to certain other types of light, such as infrared signals. Furthermore, in some examples, a through-hole aperture 218 can be filled with a clear, transparent, or translucent material to permit signals to pass through the aperture 218 while preventing passage of contaminants through the lower resting surface 216. Thus, the lower resting surface 216 may not include a physical opening or through-hole, and the lower resting surface 216 can form a continuous, flush surface with a transparent window or portion thereof.

In at least one example, the input device 200 can measure a tack position relative to a rest surface including inertial tracking, magnetic tracking, ultrasonic tracking, or other optical flow or visual inertial odometry methods, optical range finder tracking, similar methods, and combinations thereof. In this way, the tack position can be tracked as well as detecting when the input device 200 is lifted off the rest surface. In at least one example, magnetic tracking can include a magnetic source (permanent or electromagnet) and a magnetic field detector that can estimate the position in space of the source. In such an example, the magnet can be in the input device 200 and the detector can be in the computing device. In at least one example, the magnet can be in the computing device and the detector can be in the input device 200. In at least one example, an optical method (i.e., visual odometry method) can include one or more optical sensors in the input device 200 (e.g., low resolution cameras) that can detect the surrounding environment and estimate motion by measuring how fast visual features of the environment move or change. This could include a single visual sensor at or near the bottom of the input device 200, which is not constrained to operate at a fixed distance, or multiple sensors positioned at various location along or around the outer surface of the input device 200.

In at least one example, the grip portion 214 is formed of a single, unitary piece of material. In such an example, the grip portion 214 and the base portion 215 are fixed in position relative to one another. In another example, the grip portion 214 and the base portion 215 are formed as separate pieces but remain fixed in position relative to one another such that moving one portion correspondingly moves the other portion. In at least some examples, the grip portion 214 and the base portion 215 are formed as separate pieces and the grip portion 214 can be moved, rotated, depressed, deflected, translated, or otherwise manipulated relative to the base portion 215 while the mouse 200 is in an expected operating condition (i.e., not disassembled, non-functioning, broken, etc.). These and other examples are described in more detail below with reference to other figures.

Any of the features, components, and/or parts, including the arrangements and configurations thereof shown in FIGS. 2A-2B, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the examples of the devices, features, components, and parts shown in FIGS. 2A-2B.

Figure 3A:
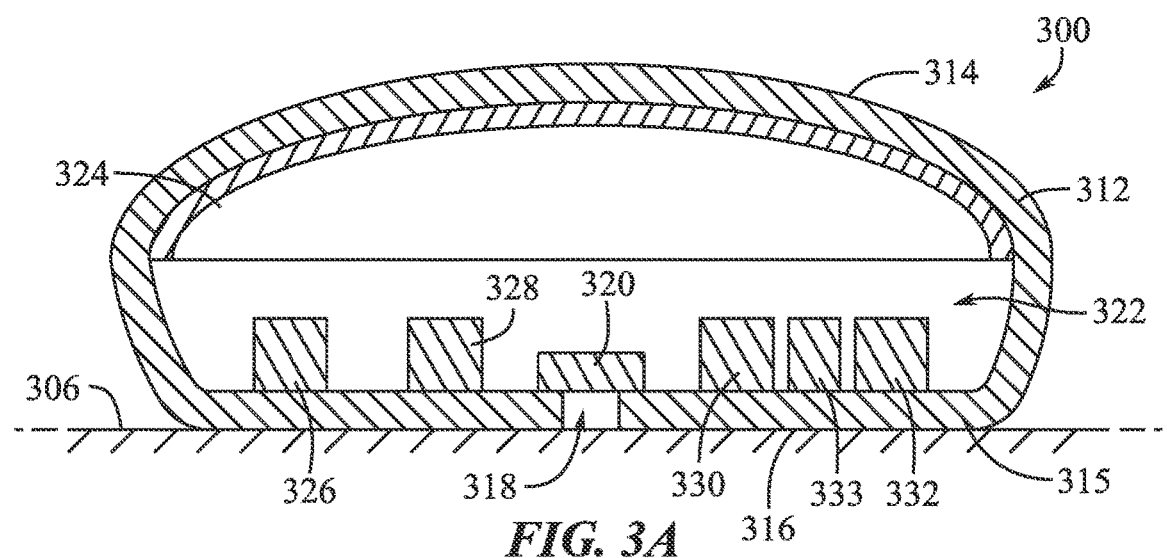
FIG. 3A shows a side cross-sectional view of an example of an input device.

FIG. 3A illustrates a schematic cross-sectional view of another example of an input device 300 including a housing 312 having a grip portion 314 and a base portion 315 defining a rest surface 316. The housing 312 can define an internal volume 322. The example of the input device 300 in FIG. 3A is resting on a support surface 306 such that the rest surface 316 of the base portion 315 contacts the support surface 306. The user can handle the input device 300 with the rest surface 316 contacting the support surface 306 as shown, and the position sensor 320 can be disposed in the internal volume 322 at or aligned with the aperture 318 to send and receive light or other particles/waves through the aperture 318 defined in the base portion 315. The position sensor 322 can detect a movement (e.g., a velocity or a change in point-to-point position) and position (e.g., a displacement or a vertical distance) of the input device 300 relative to the support surface 306 as the user slides the input device 300 across the support surface 306.

In at least one example, the input device 300 can include a touch sensor 324 disposed against the grip portion 314. The touch sensor 324 can include one or more capacitive touch sensors, plates, pads, or other sensors configured to detect touch contact (or very near contact) between the user and the housing 312, for example between the user's fingers or hand and the grip portion 314. In at least one example, the input device 300 can include a tilt sensor 326 disposed in the internal volume 322 as well as a processor 328 disposed in the internal volume 322 and in electrical communication with the position sensor 320 and the tilt sensor 326. In addition, the input device 300 can include a memory component 330 electrically coupled to the processor 328. In at least one example, the input device 300 can include a battery. In at least one example, the input device 300 can include a radio.

In at least one example, the tilt sensor 326 can include a sensor or sensor assembly configured to detect a tilt angle of the rest surface 316. In at least one example, the tilt sensor 326 can include one or more accelerometers, gyroscopes, magnetometer, similar sensors, or combinations thereof. In at least one example, the tilt sensor 326 includes an inertial measurement unit (IMU) disposed in the internal volume 322. An IMU can be configured to detect rotation of the mouse 300 in up to three degrees of freedom and can be configured to detect translation of the mouse 300 through space in up to three degrees of freedom.

Figure 3B:
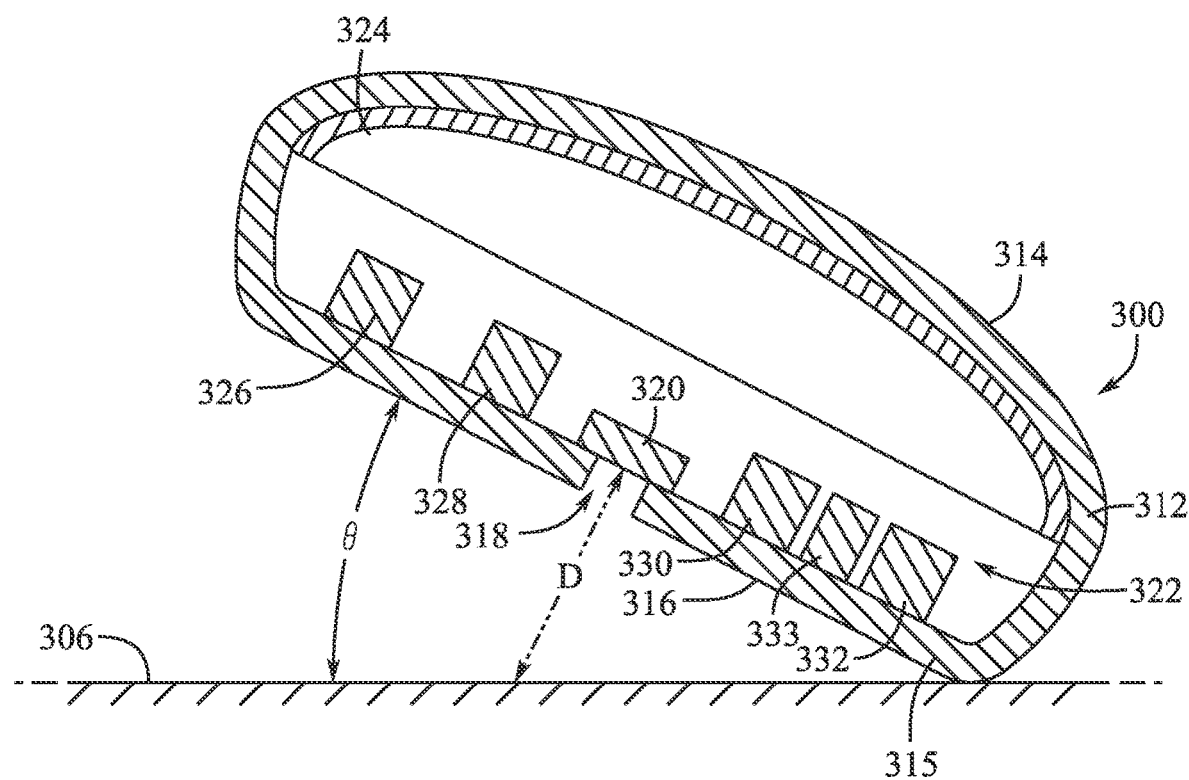
FIG. 3B shows a side cross-sectional view of the input device shown in FIG. 3A when tilted on a support surface.

FIG. 3B illustrates the input device 300 with the housing 312 held so that the base portion 315 has its primary, substantially flat bottom surface positioned at an angle $\theta$ relative to the support surface 306. The angle $\theta$ defines the angle between the planes defined by the rest surface 316 of the input device 300 and the support surface 306. The input device 300 can be positioned as shown, for example, when a user lifts one side of the input device 300 off the support surface 306 while leaving at least a portion of the base portion 315 in contact with the support surface 306. The tilt sensor 326 disposed in the internal volume 322 can detect the angle $\theta$. In addition, the position sensor 320 can be configured to detect a distance D between the aperture 318 or the rest surface 316 of the lower portion 315 near the aperture 318 and the support surface 306. In at least one example, the position sensor 320 can include a time-of-flight sensor (e.g., an optical ToF sensor) configured to determine the distance D. In at least one example, the position sensor 320 is in optical sensor electrically coupled to the processor 328 which can determine the distance D based on a signal to noise ratio. That is, in at least one example, the noise of the signal sent through the aperture 318 by the position sensor 320 can increase as the distance D increases such that the signal noise can be correlated to the distance D.

Detecting both the angle $\theta$ and the distance D, and, in some examples, the angular speed of a movement detected by a gyroscope, can enable the processor 328 to determine whether the input device 300 has been completely lifted off the support surface 306 or if the user has only tilted one side of the input device 300 upward while maintaining some contact with the support surface 306 as shown in FIG. 3B. As noted above, in at least one example, the processor 328 can be electrically coupled to the position sensor 320, the tilt sensor 326, and the memory component 330. The memory component 330 can store electronic instructions that, when executed by the processor 328, cause the processor 328 to receive a first input from the tilt sensor 326 and receive a second input from the position sensor 320. Based on the first and second inputs (i.e., the angle θ and the distance D, respectively), the processor 328 can determine if base portion 315 is in contact with the support surface 306. The processor 328 can also determine the angle θ of the base portion 315 relative to the support surface 306. As noted above, the electronic instructions, when executed by the processor 328, can also determine if the base portion 315 is not in contact with the support surface 306, such that the input device is lifted completely off the support surface 306, based on the first signal and the second signal. In at least one example, the first signal can include data or information indicating the angle θ and the second signal can include data or information indicating the distance D. In at least one example, when the input device 300 is completely lifted so as not to contact the rest surface 316, the difference of angular speed detected by a gyroscope or motion sensor of the input device 300 can be higher compared to when the input device 300 rests fully or partially on the rest surface 316.

In one example, when the angle θ is above a certain angular threshold and the distance D is below a certain distance threshold (the distance threshold being potentially determined in part relative to a certain angle threshold of θ), and because the diameter or cross-dimension of the base portion 315 is known, those two inputs can determine that at least a portion of the base portion 315 is still in contact with the support surface 306. Conversely, in another example, when the angle θ is below a certain angular threshold and the distance D is below a certain distance threshold (again, the two thresholds being potentially dependent in part on one another), the processor 328 can determine the input device 300 has been lifted off the support surface 306 completely.

In at least one example, the processor 328 can output a signal based on the angle θ and the distance D. For example, if the processor 328 determines the base portion 315 is still in contact with the support surface 306, even if only at the corner edge portion of the base portion 315 as shown in FIG. 3B, and the user has tilted the input device 300 as shown in FIG. 3B, the processor 328 can send a signal to a computing device (e.g., the computing device 102 shown in FIG. 1) to perform a first function. If the processor 328 determines the input device 300 is in the position shown in FIG. 3A, the processor 328 can send a second different signal to a computing device to perform a second function. Further, if the processor determines the input device 300 has been lifted completely off the support surface 306 based on the two inputs of the angle θ and the distance D, the processor can send a third signal to the computing device to perform a different function.

In this way, the processor 328 can determine how the user is physically manipulating the input device 300, whether that be in the traditional manner with the device 300 fully resting and sliding on the support surface, in a tilted manner as shown in FIG. 3B, or in a "3D mode" lifted completely off the support surface 306. Based on these different modes, the processor can interpret various movements, touch points on the grip portion 314 detected by the touch sensor 324, or other input gestures differently and send unique signals to a computer based on those unique inputs and modes.

For example, in the resting mode shown in FIG. 3A, the processor can interpret a rotation of the mouse about its central vertical axis (e.g., an axis perpendicular to the support surface 306 in FIG. 3A), as detected by one or more sensors, including an IMU of the tilt sensor 326, as an input command to a computing device for scrolling through a menu displayed on a screen. In contrast, if the user lifts the input device 300 completely off the support surface 306, the rotation of the input device 300 about the same axis can be interpreted as a command sent to rotate a visual object on the display screen. Finally, as shown in FIG. 3B, the tilted position of the input device 300 can be detected and an output command signal can be sent to the computer to switch tabs in an internet browser application. Thus, in one example, the processor 328 can be configured to output a signal based on the angle θ if the base is in contact with the support surface 306 but tilted. In another example, such a signal can be a first signal and the processor 328 can be configured to output a second signal if the base portion 315 is not in contact with the support surface 306 at all.

The examples given above regarding different modes and output commands sent to a computer based on different detected positions of the input device 300 are exemplary only and not mean to be limiting. However, these examples illustrate the functionality of the input device 300 in detecting a position and operating in a corresponding operational mode to output unique command signals for controlling a computer. These different modes and tilt positions of the input device 300, as determined by the detected angle θ and distance D, can be used to alter the output commands and operational modes of the input device 300 in many other ways not explicitly detailed herein.

In at least one example, the input device 300 can include an emitter 332 electrically coupled to the tilt sensor 326 and the position sensor 320. The emitter 332 can also be in electrical communication with the processor 328 and configured to send the first signal including the angle θ detected by the tilt sensor 326 and the second signal including the distance D detected by the position sensor 320. In at least one example, the input device 300 does not include a processor. In such an example, the processor in electrical communication with the emitter 332 can be a part of another device in a computer input system. For example, the processor can be disposed in the computing device controlled by the input device 300, for example the computing device 102 shown in FIG. 1. The emitter 332 can be wirelessly connected to the processor of the separate computing device or the emitter 332 can be hardwired to the computing device for communicating the signals that indicate the tilt position of the input device 300. Thus, in some embodiments, the processor 328 can send signals (e.g., the sensor output signals of the tilt sensor 326 and position sensor 320) to an external device (e.g., device 102, see FIG. 1) which interprets the signals to determine how the user is operating and positioning the mouse 300 relative to a support surface. This can be beneficial in reducing the complexity and increasing the energy efficiency of the mouse 300.

As used herein, parts in "electrical communication" with each other are configured to exchange electrical signals, directly or indirectly, between each other, whether unidirectionally or bidirectionally. A sensor or emitter can be said to be in electrical communication with a processor if the processor is using signals generated by the sensor or emitter or if the processor is using signals reliant upon or derived at least in part on the signals generated by the sensor or emitter. For example, the sensor or emitter can be in electrical communication with a processor via an input device adapter (i.e., a touch controller board or similar component) and an electrical communications bus.

As the user manipulates the input device 300, and as output command signals corresponding to different positions of the input device 300 are varied, the input device 300 can also provide user feedback to confirm user intent or otherwise communicate with and notify the user. Along these lines, in at least one example, the input device 300 can include a feedback module 333. In at least one example, the feedback module 333 can include a haptic engine for providing haptic feedback to the user (e.g., a vibration, shake, or haptic pulse). In at least one example, the feedback module 333 can include one or more lights that can be visible through the housing 312 or at a surface of the housing 312. In at least one example, the feedback module 333 can include a speaker or other audio feedback component. In at least one example, the feedback module 333 can include one or more of any of the examples described above and any combination thereof to alert the user in multiple ways. In at least one example, the feedback module 333 can be a haptic feedback module, for example including a haptic engine, can be activated in response to various movements and gestures of the mouse, for example tilting and/nor rotating as described herein, to provide feedback to the user as the user manipulates the input device 300. For example, the feedback module 333 can indicate a confirmation of user intent to the user or that an operation has been carried out in response to a user's manipulation of the input device 300.

Any of the features, components, and/or parts, including the arrangements and configurations thereof shown in FIGS. 3A-3B, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 3A-3B.

Figure 4A:
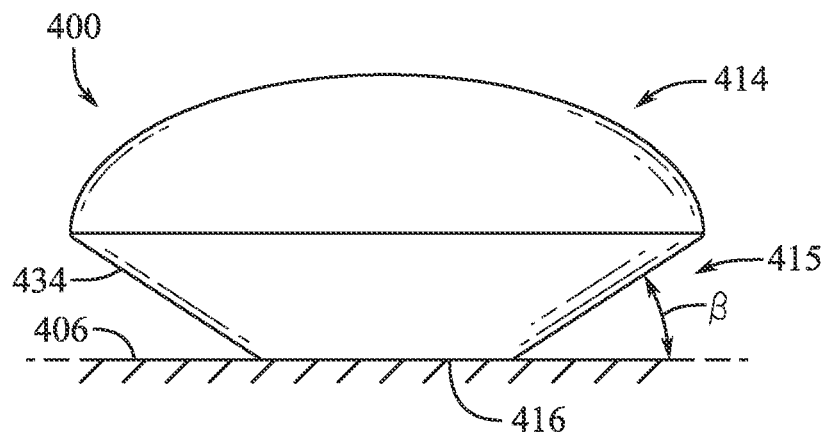
FIG. 4A shows a side view of an example of an input device.

FIG. 4A illustrates a side view of another example of an input device 400. The input device 400 can include a grip portion 414 and a base portion 415. The base portion 415 can include or define the rest surface 416 configured to contact a support surface 406 bearing the weight of the input device 400 during use. The input device 400 is shown resting on the support surface 406 with the rest surface 416 of the base portion 415 contacting the support surface 406 in FIG. 4A. In at least one example, the base portion 415 can also include a tilt surface 434 angled relative to the rest surface 416 and extending between the rest surface 416 and the grip portion 414. In at least one example, the tilt surface 434 can be angled to define an angle β relative to the rest surface 416.

Figure 4B:
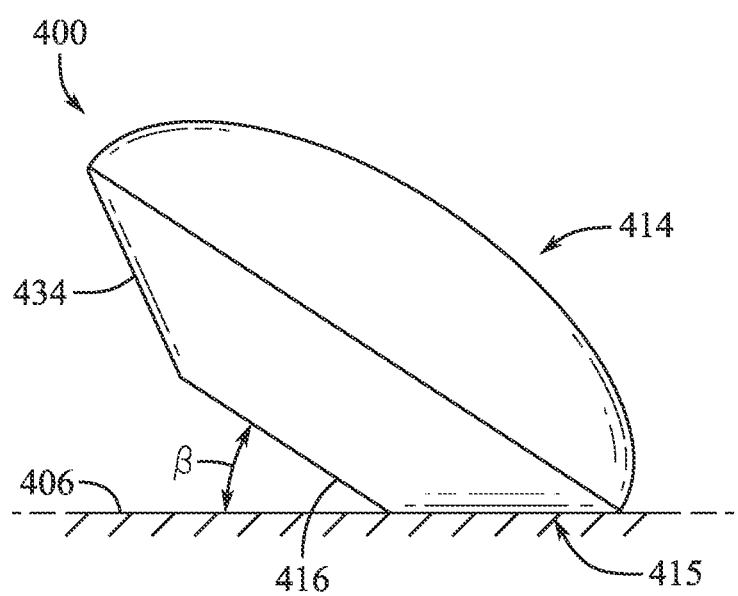
FIG. 4B shows a side view of the input device shown in FIG. 4A when tilted on a support surface.

FIG. 4B illustrates the same input device 400 when manipulated by a user such that the tilt surface 434 is in contact with the support surface 406. In such a position, the rest surface 416 is lifted off the support surface 406 at the same angle β at which the tilt surface 434 is disposed relative to the rest surface 416. In the tilted position of the input device 400 shown in FIG. 4B, the tilt surface 434 is contacting the support surface 406 to bear the weight of the input device 400. In some embodiments, the position of FIG. 4B can be a stable position, wherein the mouse 400 will remain in the position without falling back to the position of FIG. 4A if a user releases his or her grip on the mouse 400. In some configurations, the mouse 400 reverts from the position of FIG. 4B to the position of FIG. 4A when the user's grip is released. The mouse 400 can have a smooth, frusto-conical tilt surface 434, wherein the mouse 400 can roll on the tilt surface while the tilt surface 434 remains in contact with the support surface 405. In this manner, the mouse 400 can rotate along a path defined by continual contact between the tilt surface 434 and the support surface 406 to provide a rotational input mode while also tilted. Various tilt orientations of the mouse 400 can correspond to different inputs or commands, or the transition between different tilt orientations (e.g., while the mouse 400 rolls on surface 434) can adjust an input provided in a similar manner to rotating a dial or spinning a sphere of a thumb ball mouse.

In at least one example, the input device 400 can include any or all of the components of the input device 300 shown in FIGS. 3A and 3B, including one or more tilt sensors such as an IMU, position sensors such as optical position sensors, processors, emitters, and so forth. In at least one example, an IMU of the input device 400 shown in FIGS. 4A and 4B can be configured to detect if the input device 400 is supported on the resting surface 416 or the tilt surface 434.

Any of the features, components, and/or parts, including the arrangements and configurations thereof shown in FIGS. 4A-4B, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 4A-4B.

Figure 4C:
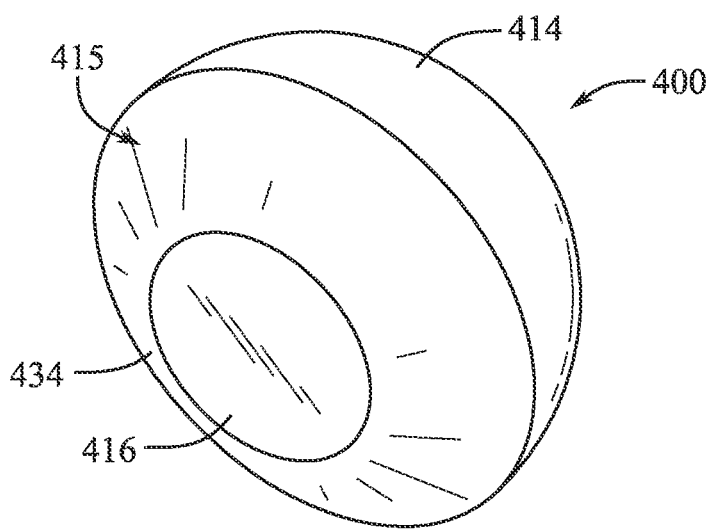
FIG. 4C shows a bottom perspective view of an example of an input device.

FIG. 4C illustrates a lower perspective view of an input device 400 similar to that shown in FIGS. 4A and 4B. The input device 400 of FIG. 4C includes a grip portion 414 and a base portion 415. The base portion 415 can include a rest surface 416 and a tilt surface 434 extending from the rest surface 416 to the grip portion 414 at an angle relative to the rest surface 416. In at least one example, a position sensor disposed within the input device 400 can be configured to send and receive signals, such as light, through a transparent or semi-transparent rest surface 416. In such an example, the rest surface 416 is transparent or semi-transparent and formed as a single, solid piece without defining an aperture. In at least one example, the transition portion or edge between the rest surface 416 and the tilt surface 434 can be abrupt to form a sharp or crisp edge (e.g., with a radius of curvature less than or equal to 2 millimeters) where the two surfaces 416, 434 meet at an angle. Similarly, in at least one example, the transition between the tilt surface 434 and the grip portion 414 can form an abrupt or sharp edge where the two surfaces 414, 434 meet at an angle. In at least one example, the tilt surface 434 can be a single surface extending or curving around the circular rest surface 416 and extending straight from the rest surface 416 to the grip portion 414 in a linear or straight manner, as seen from a side view similar to that shown in FIGS. 4A and 4B.

Figure 5:
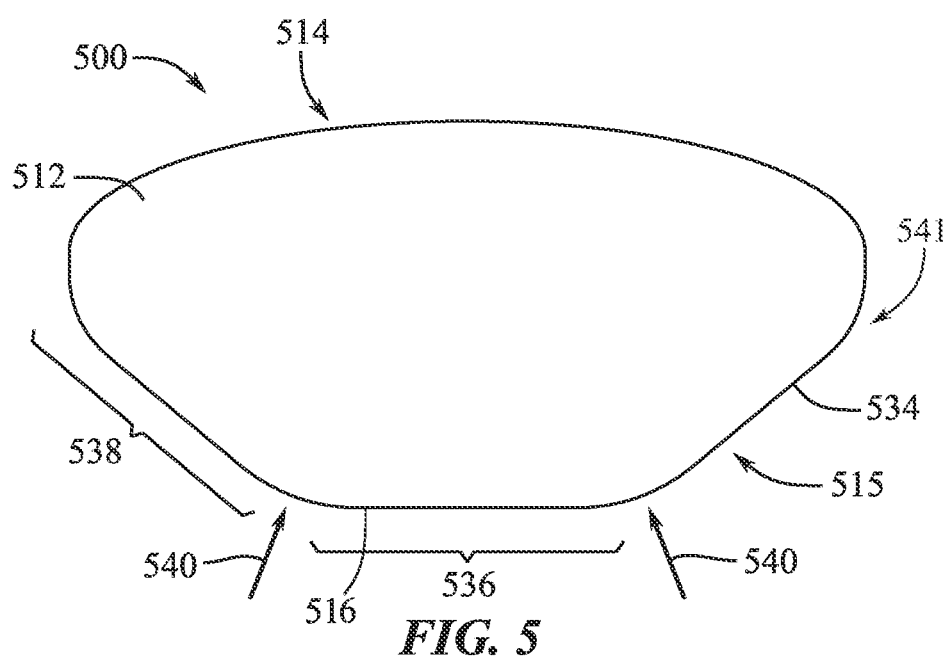
FIG. 5 shows a side view of an example of an input device.

In one or more other examples, such as shown in FIG. 5, the edge 540 or curved transition portion of the housing 512 where the rest surface 516 meets the tilt surface 534 can be rounded to form a gradual transition (e.g., with a radius of curvature greater than 2 millimeters) between the two surfaces 516, 534. In addition, the edge 541 or curved transition portion of the housing 512 where the tilt surface 534 meets the grip portion 514 can be similarly rounded (or even more rounded than edge 540) to form a gradual transition between the two surfaces 534, 514. FIG. 5B shows a side view of the input device 500 to illustrate an example with rounded transitions between the various surfaces and portions 516, 534, 514.

As shown, the rest surface 516 can include a first flat portion 536 and the tilt surface 534 can form a second flat portion 538. A rounded edge or transition portion 540 can be disposed between the rest surface 516 and the tilt surface 534, or more specifically between the first flat portion 536 of the rest surface 516 and the second flat portion 538 of the tilt surface 534. In addition, a rounded edge or portion can form a gradual transition between the second flat portion 538 of the tilt surface 534 and the grip portion 514 of the housing 512 of the input device 500. In examples such as that shown in FIG. 5, when a user manipulates the input device 500 to tilt from the rest surface 516 to the tilt surface 534, the rounded edge or portion 540 can provide a smooth and pleasing tactile experience when transitioning from a resting position to a tilt position. The rounded edge can also allow the user to more easily make a gradual change in the tilt angle of the input device 500, such as in embodiments where an input signal can be provided proportional to the amount or angle of tilt of the input device 500, as compared to a binary system (i.e., only detected as being tilted or not tilted). In contrast, if more dramatic or binary tilt input or a more abrupt haptic feel is desired, the input device 500 can include or abrupt transitions or edges between the various surfaces and portions 516, 534, 514 as shown in other examples (e.g., the input device 400 shown in FIGS. 4A and 4B).

In at least one example, the entire base portion 515 is continuously curved, for example having a constant radius of curvature or a continuously changing radius of curvature, thereby allowing continuous tilting at any point along the base portion 515. In at least one example, the input device 500 can include one or more contact sensors positioned within the input device 500 at or along the base portion 515. In such an example, the point at which the base portion 515 contacts the rest surface during can be detected via the contact sensor. The function of the input device 500 can be a function of the detected location of contact along the curved base portion 515.

Any of the features, components, and/or parts, including the arrangements and configurations thereof shown in FIG. 5, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5.

Figure 6A:
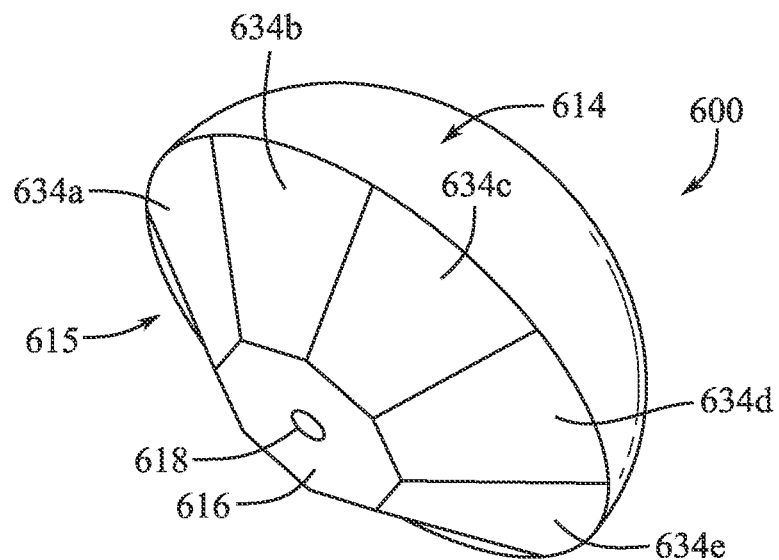
FIG. 6A shows a bottom perspective view of an example of an input device.

FIG. 6A illustrates a lower perspective view of another example of an input device 600 including a grip portion 614 and a base portion 615. The base portion 615 includes a rest surface 616 defining an aperture 618. The rest surface 616 can be planar or flat. In at least one example, the base portion 615 of the input device 600 can include a plurality of tilt surfaces 634a, 634b, 634b, 634d, and 634e illustrated in FIG. 6A, but can include more or fewer tilt surfaces 634. The plurality of tilt surfaces 634a through 634e can each be flat or planar and can be disposed at angled relative to adjacent surfaces of the plurality of tilt surfaces 634a through 634e. Thus, the tilt surfaces 634 and rest surface 616 can define a multi-faceted lower end of the input device 600. For example, the tilt surface 634a can be a first tilt surface and the tilt surface 634b can be a second tilt surface adjacent the first tilt surface and disposed at an angle relative to the first tilt surface. Each of the tilt surfaces 634a through 634e can also be disposed at an angle relative to the rest surface 616 and extend between the rest surface 616 and grip portion 614 of the input device 600. In at least one example, the grip portion 614 can be curvilinear or substantially dome-shaped.

Figure 6B:
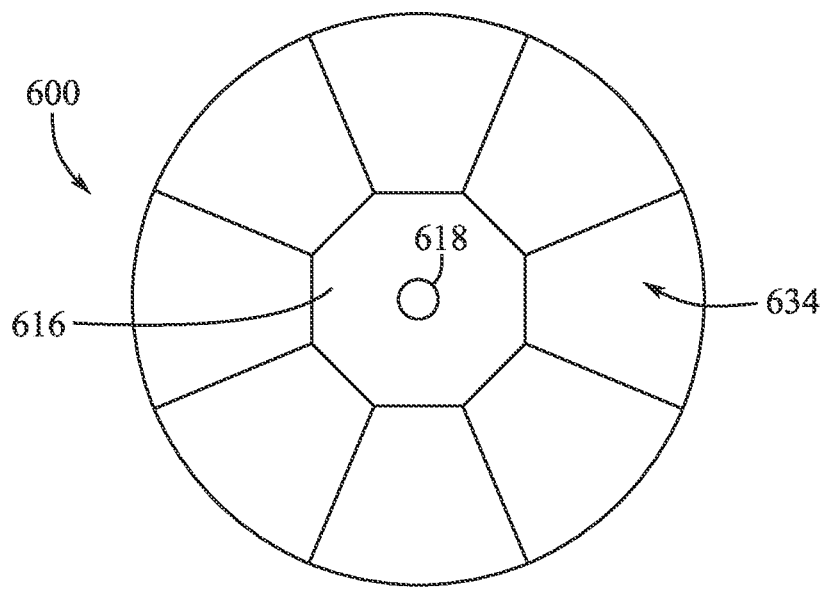
FIG. 6B shows a bottom plan view of the input device of FIG. 6A.

FIG. 6B shows a bottom plan view of the input device 600. The rest surface 616 is shown defining the aperture 618 through which a position sensor can send and receive signals. The tilt surface 634 is also shown having a plurality of distinct sections or a sub-surfaces arranged around the rest surface 616 and extending from the rest surface 616 to an outer circumferential edge of the input device 600 where the tilt surface 634 meets the grip portion 614. The example shown in FIGS. 6A and 6B of the input device 600 includes eight separate and distinct sections of the tilt surface 634. However, other examples can include more or less than the eight sections shown.

The plurality of distinct tilt surfaces 634a through 634e surrounding and extending from the rest surface 616 provide discrete directions toward which the user can tilt the input device 600 from resting on the rest surface 616 to resting on the tilt surface 634. In such an example, the user can receive tactile feedback from each distinct portion of the tilt surface 634 as the desired section or portion of the tilt surface 634 contacts the support surface during use. In at least one example, the input device 600 shown in FIGS. 6A and 6B can include any or all of the components of other input devices described herein, for example the input device 300 shown in FIGS. 3A and 3B. For example, the input device 600 can include one or more tilt sensors, including one or more IMU sensors, in addition to one or more position sensors. These sensors can be configured to determine the angle of the rest surface 616 relative to a support surface on which the input device 600 and be manipulated. When tilted by the user, for example when of the input device 600 is resting on the tilt surface 634 or one of the plurality of discrete tilt surfaces 634a-634e of the tilt surface 634, the one or more sensors of the input device 600, for example one or more IMU sensors, can be configured to detect if the input device 600 is supported on one of the plurality of tilt surfaces 634a through 634e, such as, for example, the first planar tilt surface 634a or the second planar tilt surface 634b of the tilt surface 634.

In at least one embodiment, one or more of the individual tilt surfaces 634a through 634e of the tilt surface 634 can define an aperture through which a position sensor can send and receive signals to detect a distance between a support surface on which the input device 600 rests and the corresponding tilt surface 634a through 634e. This can be accomplished with each position sensor corresponding to each of the plurality of tilt surfaces 634a through 634e similar to the position sensor 320 shown in FIG. 3B detecting the distance D away from the support surface 306.

Any of the features, components, and/or parts, including the arrangements and configurations thereof shown in FIGS. 6A-6B, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 6A-6B.

Figure 7:
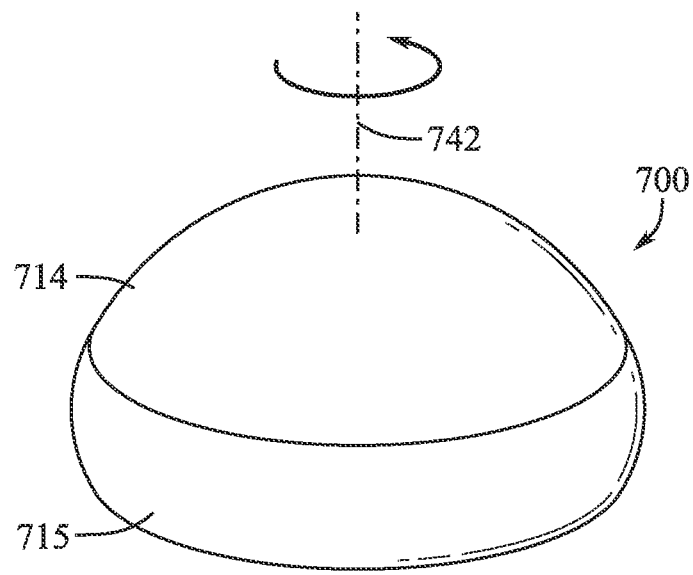
FIG. 7 shows a perspective view of an example of an input device.

FIG. 7 illustrates an example of an input device 700 including a grip portion 714 and a lower base portion 715. The base portion 715 can be configured to rest on a support surface during use and the input device 700 can define a central axis 742 normal to the lower surface of the base portion 715 or normal to the support surface on which the base portion 715 rests during use. The input device 700 can include an orientation sensor such as an IMU sensor to detect a rotation of the grip portion 714 about the central axis 742. The device 700 can include one or more other sensor such as a position sensors configured to send and receive light through one or more apertures defined by the base portion 715.

As shown in FIG. 7, in at least one example, the grip portion can be symmetric about the central axis 742 in any cross-sectional plane including the central axis 742. In at least one example, the grip portion 714 can be rotated about the central axis 742 relative to the base portion 715. That is, in at least one example, the grip portion 714 and the base portion 715 are rotatably coupled as two separate pieces of the input device 700. Further, in at least one example, the grip portion 714 can be independently articulable or compressible up and down parallel in the direction of the central axis 742 or in other directions at an angle relative to the central axis. In at least one example, the grip portion 714 can be pushed, pressed, or depressed relative to base portion 715.

The manipulation (e.g., axial rotation) of the grip portion 714 relative to the base portion 715 can be detected by the input device 700 and one or more output command signals can be generated by the input device 700 based on the unique manipulation of the grip portion 714. The output command signal from the input device 700 can be sent to a computing device to cause the computing device to perform one or more functions. For example, when controlling one or more images on a display of the computing device, the rotation of the grip portion 714 about the central axis 742 can cause the input device 700 to send a command signal to manipulate the visual image displayed on the computing device. If the grip portion 714 is depressed or pushed without rotating about the central axis 742, the input device can send a different command signal to the computing device to do something different (e.g., to manipulate a displayed visual image differently or to adjust a different property of the user data or graphical user interface). In examples described above referencing the manipulation of the display images displayed by the computing device are not meant as limiting but rather exemplary. Other command signals sent by the input devices described herein can cause a computing device to perform one or more other functions not visually seen by the user.

In at least one example, a combination of depressing the grip portion 714 along with a tilt or rotation of the input device 700 can indicate a clutch-type mechanism or an indicator of what the intent of the user is. Conversely, a tilt or rotation of the input device 700 without a click or depression of the grip portion 714 can indicate can be used as an indicator of intent.

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7.

Figure 8:
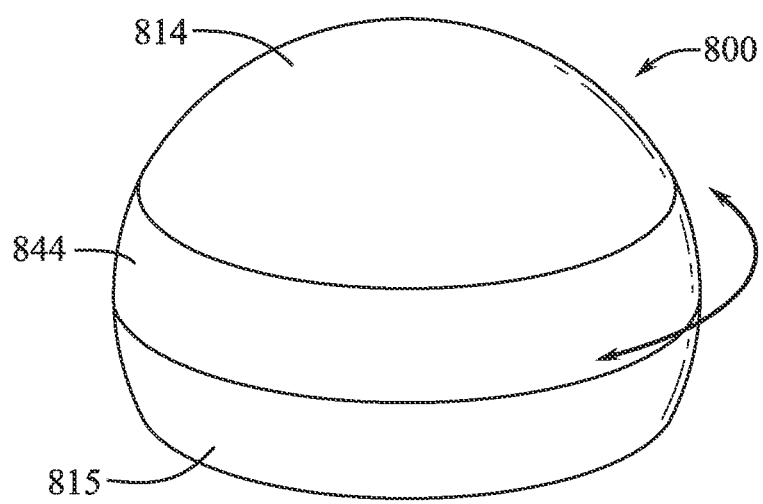
FIG. 8 shows a perspective view of an example of an input device.

FIG. 8 illustrates a perspective view of another example of an input device 800. The input device 800 can include a grip portion having an upper section 814 and a base portion 815. In addition, the grip portion 814 can include a sidewall 844 disposed between the upper section 814 and the base portion 815. The sidewall 844 can be axially rotatable relative to the upper section 814 and the base portion 815 about a vertical axis (similar to axis 742 in FIG. 7). In at least one example, the sidewall 844 can define an outer side surface rotatable relative to the upper section 814 and the base portion 815 indicated by the arrows shown in FIG. 8. In some embodiments, the base portion 815 can comprise a tilt surface (e.g., one of the tilt surfaces of other embodiments herein, such as surface 434 shown in FIGS. 4A-4C).

As noted above with reference to other examples of input devices, the input device 800 shown in FIG. 8 can include an orientation sensor including one or more of the orientation sensors, such as tilt sensor having IMU sensors, for detecting the rotation of the sidewall 844. In some examples, the orientation sensor can include an encoder, a mechanical device, or an optical device that can detect a rotation of the sidewall 844. In any case, the orientation sensor of the input device 800 can be configured to detect a rotation of the sidewall 844 relative to the upper grip portion or section 814.

Any of the features, components, and/or parts, including the arrangements and configurations thereof shown in FIG. 8 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 8.

Referring back to the input device 200 shown FIGS. 2A and 2B and described above, at least one example of the input device 200 includes a housing 212 formed as a single unitary piece including the grip portion 214 and the base portion 215 formed as a single piece. In such an example, the various sensors of the input device 200, including one or more orientation sensors such as a tilt sensor, IMU sensor, one or more position sensors, and so forth as described with reference to other examples of input devices herein, can be configured to detect a rotation of the input device 200 about a central axis normal to the lower surface 216. The user can rotate the entire input device 200 about the central axis as the lower surface 216 contacts the support surface during use. Similar to the input devices 700, 800 shown in FIGS. 7 and 8, the input device 200 can be configured to output command signals to a computing device based on a detected rotation of the housing 212.

Figure 9:
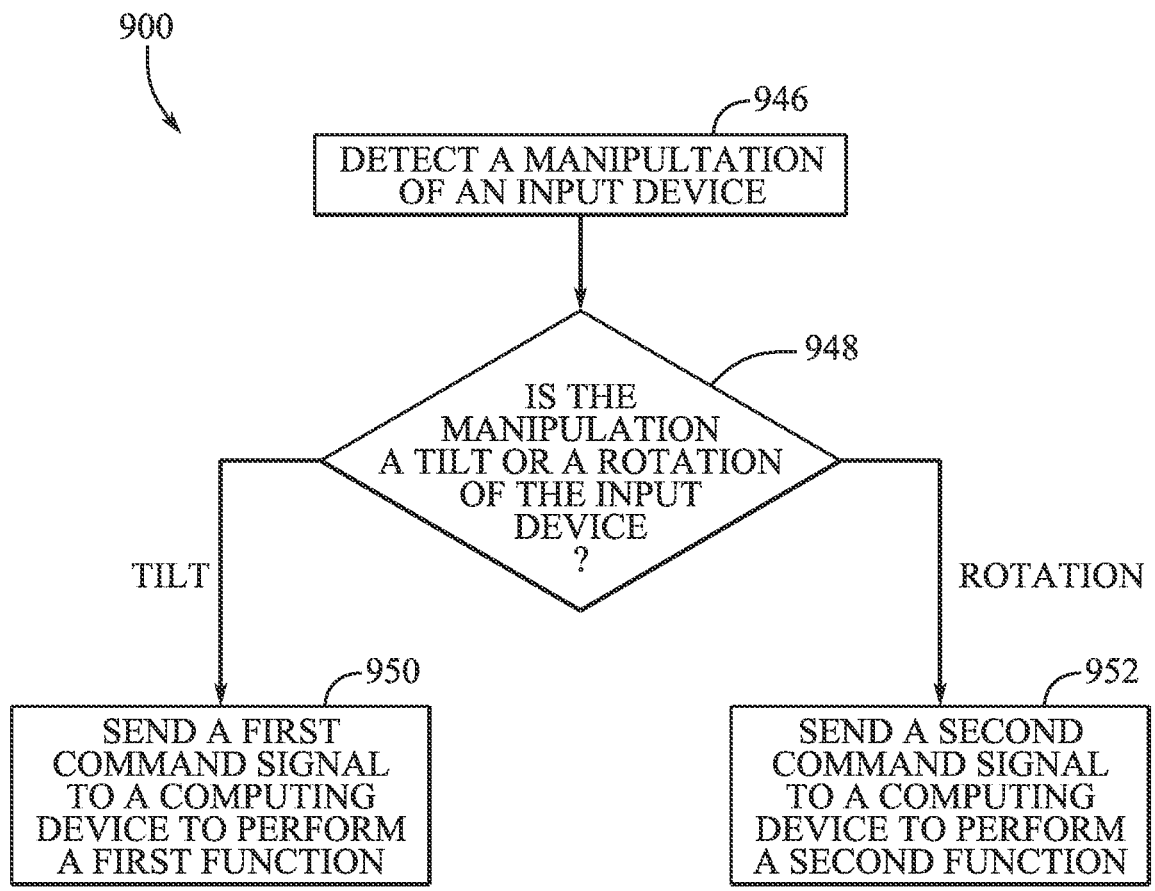
FIG. 9 shows a flowchart of an example of a method for controlling a computing device with an input device.

FIG. 9 illustrates a chart of a method 900 for using an input device to cause a computing device to perform a function. In at least one example embodiment of the method 900, the first block 946 of the method 900 can include detecting a manipulation of an input device. The input device can include any of the input devices described herein and shown in FIGS. 1-8. In at least one example, at block 948 of the method 900, the input device can determine if the manipulation is a tilt or a rotation of the input device or a portion of the input device. The tilt of the input device is shown in at least FIGS. 3A-6B and described herein. Examples of rotations of the input device are shown in at least FIGS. 2A, 2B, 7, and 8 and described herein. If the manipulation is a tilt of the input device, one step of the method 900 at block 950 can include sending a first command signal from the input device to a computing device to cause the computing device to perform a first function or a first signal that, upon receipt of the signal, causes an external controller or processor of the computing device to perform a first function (e.g., switch windows in a GUI). If the manipulation is a rotation of the input device or a portion of the input device, one step of the method 900 at 952 can include sending a second command signal from the input device to a computing device to cause the computing device to perform a second function or a second signal that, upon receipt of the signal, causes the external controller or processor of the computing device to perform a second function (e.g., zoom in or out on a GUI element).

As noted above, the functions carried out by a computing device, as commanded by the input devices described herein, can vary depending on the type of manipulation and the position of the input device relative to a support surface. The command signal sent by the input device as described herein can also vary depending on a detected touch input from the user's hand or fingers as detected by the touch sensor of the input device. In at least one example where the device is tilted such that the first command signal is sent to the computing device, the first function performed by the computing device can include any number of functions.

In at least one example, the first function performed by the computing device in response to the first signal sent after a tilt of the input device is detected can include a pan function of one or more visual images translated across a display screen of the computing device. In at least one example, the first function can include an undo or a redo command in a word processor or other software application. In at least one example, the tilt of the input device can cause a switching of workspace including windows of various different applications on the display screen. In at least one example, the tilt of the input device can cause a change in orientation of a visual object, such as a 3D visual object, displayed on the display screen of the computing device. In at least one example, the first function performed by the computing device in response to the tilting of the input device can include transport controls, clip selections within video editing programs, and so forth. In at least one example, the first function performed by the computing device can include switching a selection on a radial menu or scrolling up and down within a software application displaying text. In at least one example, the first function can include control selections, for example sliding selections affecting display brightness, color saturation, and so forth. In some examples, the degree to which the input device is tilted or the speed at which the input device is tilted can be a part of the output command signal from the input device and taken into account by the computing device to increase or decrease selection speed, to perform large adjustments versus fine adjustments within selection menus, and so forth.

In at least one example, the second function performed by the device in response to the second signal sent after a rotation of the of the input device or a portion of the input device is detected can include zooming in and out of the visual display, rotating the visual object displayed by the computing device, controlling a slider, or scrubbing a timeline within a video editing software application. The second function based on the rotation of the input device can also include a value adjustment, such as, for example, setting a timer or stopwatch. The second function in response to the rotation can include a selection of menu items in a list, selections, knobs for volume or brightness outputs, and so forth. In some examples, the degree to which the input device is rotated or the speed at which the input device is rotated can be a part of the output command signal from the input device and taken into account by the computing device to increase or decrease a selection speed or to perform large adjustments versus fine adjustments within selection menus, and so forth.

In at least one example, the second function performed by the computing device in response to a rotation of the input device can include a cursor control, color selection about a circular wheel displayed by the computing device, menu scrolling, sidebar scrolling, or any other visual or non-visual computing function.

Any of the features, components, and/or parts, including the arrangements and configurations thereof shown in FIG. 9 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 9.

Figure 10:
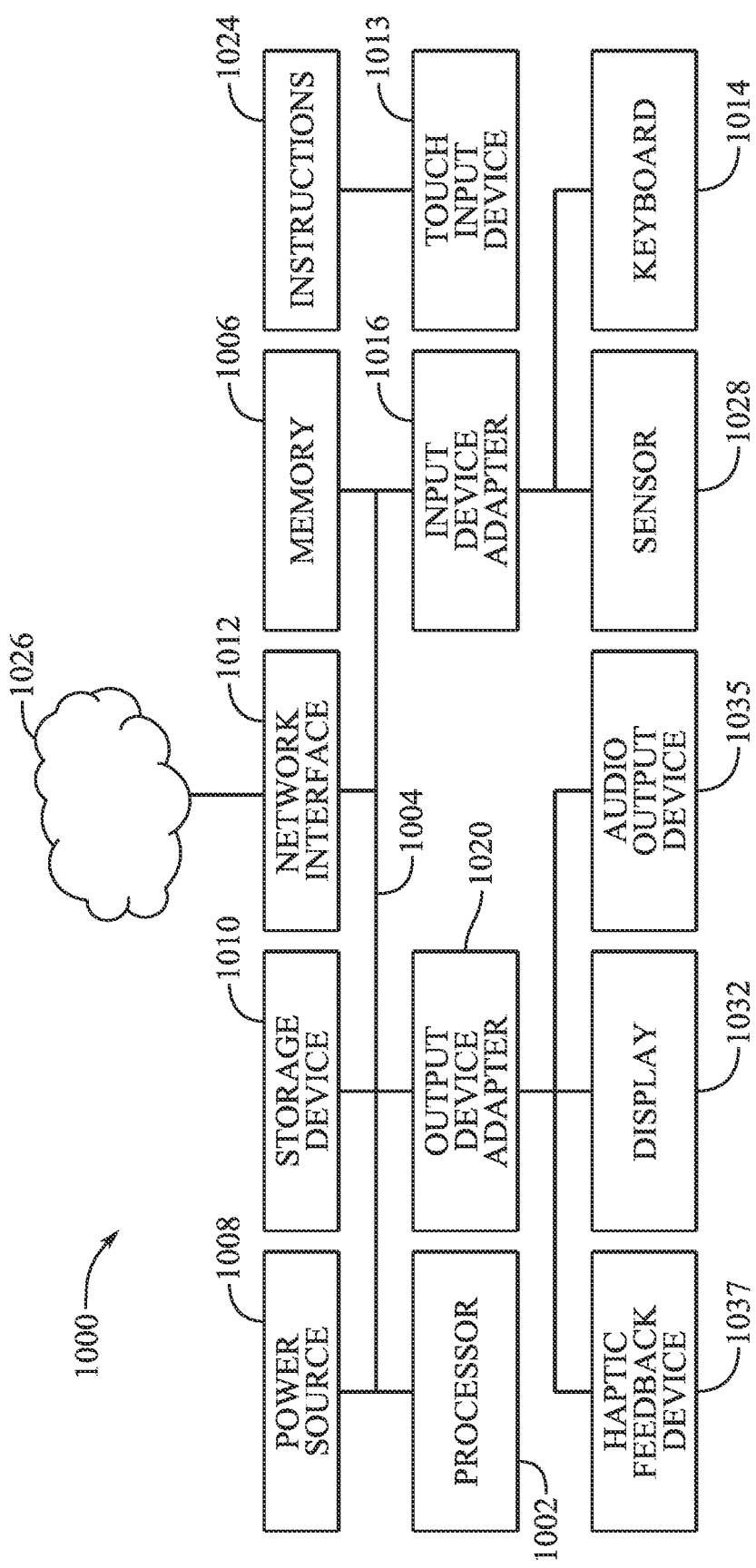
FIG. 10 shows a schematic view of an example of a computer system.

FIG. 10 shows a high-level block diagram of a computer system 1000 that can be used to implement embodiments of the present disclosure. In various embodiments, the computer system 1000 can comprise various sets and subsets of the components shown in FIG. 10. Thus, FIG. 10 shows a variety of components that can be included in various combinations and subsets based on the operations and functions performed by the system 1000 in different embodiments. For example, the computer system 1000 can be part of the computing devices 102 and input devices 100, 200, 300, 400, 500, 600, 700, and 800 described above in connection with FIGS. 1-8. It is noted that, when described or recited herein, the use of the articles such as "a" or "an" is not considered to be limiting to only one, but instead is intended to mean one or more unless otherwise specifically noted herein.

The computer system 1000 can comprise a central processing unit (CPU) or processor 1002 connected via a bus 1004 for electrical communication to a memory device 1006, a power source 1008, an electronic storage device 1010, a network interface 1012, an input device adapter 1016, and an output device adapter 1020. For example, one or more of these components can be connected to each other via a substrate (e.g., a printed circuit board or other substrate) supporting the bus 1004 and other electrical connectors providing electrical communication between the components. The bus 1004 can comprise a communication mechanism for communicating information between parts of the system 1000.

The processor 1002 can be a microprocessor or similar device configured to receive and execute a set of instructions 1024 stored by the memory device 1006. The memory device 1006 can be referred to as main memory, such as random access memory (RAM) or another dynamic electronic storage device for storing information and instructions to be executed by the processor 1002. The memory device 1006 can also be used for storing temporary variables or other intermediate information during execution of instructions executed by the processor 1002. The processor 1002 can include one or more processors or controllers, such as, for example, a CPU for the computing device 102 or input devices 100, 200, 300, 400, 500, 600, 700, and 800 in general and a touch controller or similar sensor or I/O interface used for controlling and receiving signals from the display screen 104 and any other sensors being used (e.g., 326 and 320). The power source 1008 can comprise a power supply capable of providing power to the processor 1002 and other components connected to the bus 1004, such as a connection to an electrical utility grid or a battery system.

The storage device 1010 can comprise read-only memory (ROM) or another type of static storage device coupled to the bus 1004 for storing static or long-term (i.e., non-dynamic) information and instructions for the processor 1002. For example, the storage device 1010 can comprise a magnetic or optical disk (e.g., hard disk drive (HDD)), solid state memory (e.g., a solid state disk (SSD)), or a comparable device.

The instructions 1024 can comprise information for executing processes and methods using components of the system 1000. Such processes and methods can include, for example, the methods described in connection with other embodiments elsewhere herein, including, for example, the methods and processes described in connection with FIG. 9.

The network interface 1012 can comprise an adapter for connecting the system 1000 to an external device via a wired or wireless connection. For example, the network interface 1012 can provide a connection to a computer network 1026 such as a cellular network, the Internet, a local area network (LAN), a separate device capable of wireless communication with the network interface 1012, other external devices or network locations, and combinations thereof. In one example embodiment, the network interface 1012 is a wireless networking adapter configured to connect via WI-FI®, BLUETOOTH®, BLE, Bluetooth mesh, or a related wireless communications protocol to another device having interface capability using the same protocol. In some embodiments, a network device or set of network devices in the network 1026 can be considered part of the system 1000. In some cases, a network device can be considered connected to, but not a part of, the system 1000.

The input device adapter 1016 can be configured to provide the system 1000 with connectivity to various input devices such as, for example, a touch input device 1013 (e.g., display 104 of FIG. 1 or touch sensor 324 of the input device 300 of FIGS. 3A-3B), a keyboard 1014 or other peripheral input device, one or more sensors 1028 (e.g., 326 and 320 in FIGS. 3A-3B), related devices, and combinations thereof. In an example embodiment, the input device adapter 1016 is connected to the touch input devices described herein to detect a position of touches or gestures detected by touch sensor 324 and/or sensors 326 and 320. In some configurations, the input device adapter 1016 can include the touch controller or similar interfaces described above. The sensors 1028, which can include any of the sensors of input devices described herein, can be used to detect physical phenomena in the vicinity of the computing system 1000 (e.g., light, sound waves, electric fields, forces, vibrations, etc.) and convert those phenomena to electrical signals. In some embodiments, the input device adapter 1016 can be connected to a stylus or other input tool, whether by a wired connection or by a wireless connection (e.g., via the network interface 1012) to receive input via the touch input device 1013 and via the tool.

The output device adapter 1020 can be configured to provide the system 1000 with the ability to output information to a user, such as by providing visual output using one or more displays 1032, by providing audible output using one or more speakers 1035, or providing haptic feedback sensed by touch via one or more haptic feedback devices 1037. Other output devices can also be used. The processor 1002 can be configured to control the output device adapter 1020 to provide information to a user via the output devices connected to the adapter 1020.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A computer input system, comprising:
an input device having a housing defining an internal volume, the housing including a grip portion and a base;
a tilt sensor disposed in the internal volume;
a position sensor; and
a processor electrically coupled to the position sensor, the tilt sensor, and a memory component storing electronic instructions that, when executed by the processor, cause the processor to:
receive a first input from the tilt sensor;
receive a second input from the position sensor; and
determine, based on the first and second inputs:
if the base is contacting a support surface on a tilt surface of the base, the tilt surface having a straight cross-sectional portion; and
an angle of the base relative to the support surface; and
output a signal based on the angle if the base is in contact with the support surface on the straight cross-sectional portion of the tilt surface.

2. The computer input system of claim 1, wherein the tilt sensor includes an inertial measurement unit.

3. The computer input system of claim 1, wherein the position sensor includes an optical sensor configured to send and receive light through an aperture in the base.

4. The computer input system of claim 1, wherein the input device comprises the processor.

5. The computer input system of claim 1, wherein the input device further comprises an emitter electrically coupled to the tilt sensor and the position sensor, wherein the emitter is in electrical communication with the processor and configured to output the signal.

6. The computer input system of claim 1, wherein the electronic instructions, when executed by the processor, cause the processor to determine if the input device is lifted completely off the support surface.

7. The computer input system of claim 1, wherein:
the signal is a first signal; and
the electronic instructions, when executed by the processor, cause the processor to output a second signal if the base is not in contact with the support surface.

8. An input device, comprising:
a grip portion;
a base portion, including:
a rest surface, the rest surface being planar; and
a tilt surface extending between the rest surface and the grip portion, wherein a cross-section of the tilt surface includes a straight portion; and
a tilt sensor operable to detect whether the rest surface or the straight portion of the tilt surface is supporting a weight of the input device.

9. The input device of claim 8, wherein the tilt sensor comprises an inertial measurement unit.

10. The input device of claim 8, wherein the tilt surface includes a first planar surface and a second planar surface adjacent the first planar surface.

11. The input device of claim 10, wherein the grip portion is curvilinear.

12. The input device of claim 8, further comprising an optical position sensor.

13. The input device of claim 12, wherein:
   the base portion defines an aperture; and
   the optical position sensor is positioned at or near the aperture to send and receive light through the aperture.

14. The input device of claim 13, wherein the aperture is defined by the rest surface.

15. The input device of claim 8, wherein
   the tilt surface is at least partially frusto-conical.

\* \* \* \* \*